Feb. 1, 1949.  E. L. GINZTON  2,460,498
MODULATION CONTROL APPARATUS
Filed March 15, 1943  3 Sheets-Sheet 1

INVENTOR.
E. L. GINZTON
BY
Paul B Hunter.
ATTORNEY

Feb. 1, 1949. E. L. GINZTON 2,460,498
MODULATION CONTROL APPARATUS
Filed March 15, 1943 3 Sheets-Sheet 2
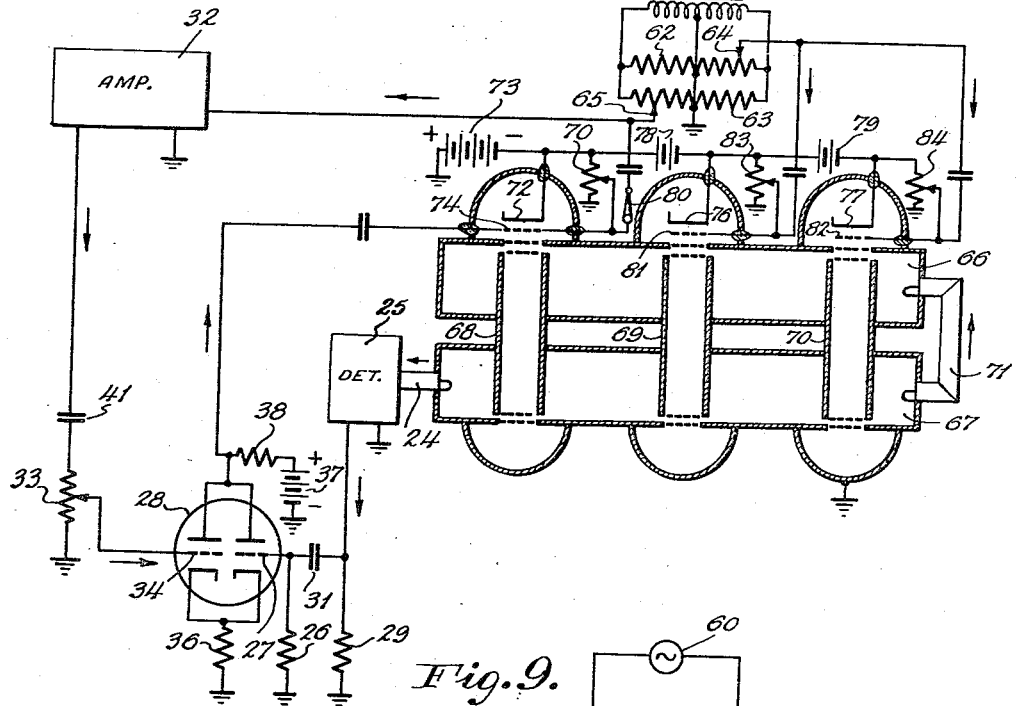
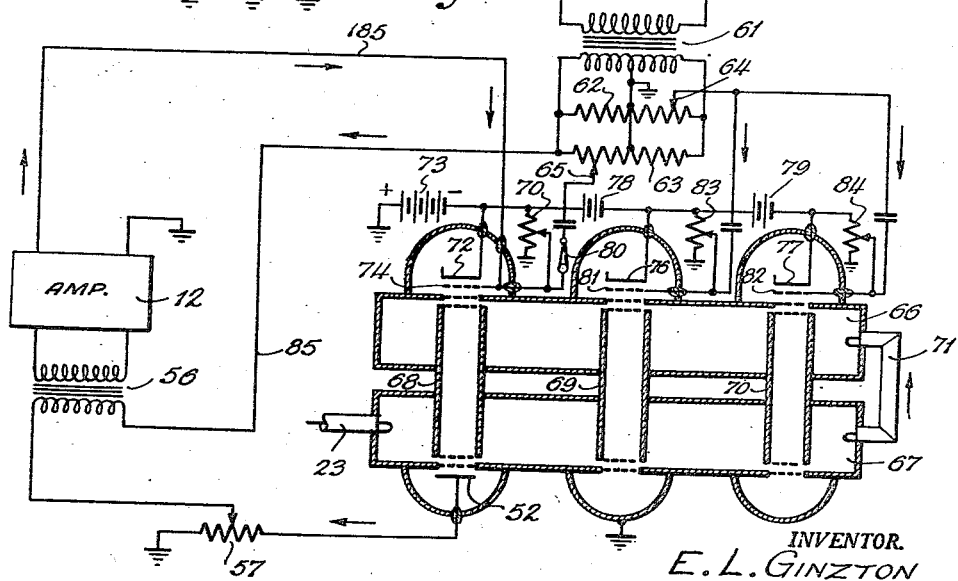
INVENTOR.
E. L. GINZTON
BY
Paul B. Hunter.
ATTORNEY Feb. 1, 1949.  E. L. GINZTON  2,460,498
MODULATION CONTROL APPARATUS
Filed March 15, 1943  3 Sheets-Sheet 3

INVENTOR.
E. L. GINZTON
BY
Paul B. Hunter
ATTORNEY

Patented Feb. 1, 1949

2,460,498

UNITED STATES PATENT OFFICE 2,460,498

MODULATION CONTROL APPARATUS

Edward L. Ginzton, Wantagh, N. Y., assignor to The Sperry Corporation, a corporation of Delaware Application March 15, 1943, Serial No. 479,293

11 Claims. (Cl. 315—6)

This invention relates to regulation and control of ultra high frequency systems and particularly to apparatus for obtaining linear modulation in ultra high frequency systems of the electron velocity variation type.

In its preferred embodiment the invention will be particularly described as applied to a system containing an electron velocity variation device of the hollow resonator type. It is known that operation of such ultra high frequency devices of the velocity variation type may be controlled as by means of a modulating signal voltage applied to a control electrode. However, in many such devices, this modulation is not strictly linear because of inherent operational and other characteristics. This non-linearity is due mainly to the fact that the current through the tube does not always vary linearly with respect to changes in the control voltage. In addition such factors as space charge effects, electron debunching in the drift space and others of like nature introduce unpredictable distortions which contribute to the non-linearity. The present invention provides automatic compensation arrangements for obtaining and maintaining linear modulation in such devices.

It is therefore a major object of my invention to provide novel apparatus for obtaining linear modulation in ultra high frequency devices of the electron velocity variation type. The invention contemplates obtaining pure amplitude modulation, pure frequency modulation or any intermediate stages of purity of said modulations, linearly.

It is a further object of my invention to provide novel apparatus for obtaining strictly linear modulation by a modulating signal applied to an electron velocity variation device of the hollow resonator type. The device may, for example, be an amplifier or oscillator as desired.

A further object of the invention is to provide a system and apparatus for applying a modulating signal to an electron velocity variation type device of the hollow resonator type, wherein novel balanced feed-back arrangements are employed for obtaining linear modulation.

It is a further object of the invention to provide a novel balanced feed-back arrangement insuring linear modulation in an electron velocity variation device of the hollow resonator type.

A further object of the invention is to provide a novel balanced feed-back arrangement for obtaining linear amplitude and/or frequency modulation in electron velocity variation devices of the hollow resonator type wherein the envelope or a demodulated version of the carrier wave in the output of said device is compared to the signal, and the resultant employed to control said modulation.

A further object of the invention is to provide a novel balanced feed-back arrangement insuring substantially linear modulation in an electron velocity variation device of the hollow resonator type, wherein the current through the device is employed to control said modulation.

Another object of the invention is to provide arrangements external to an electron velocity variation device of the hollow resonator type for correcting any non-linear relationship between electron beam current and control grid voltage. Preferably this is accomplished by balanced feed-back connections between a suitable collector electrode and said control grid.

Further objects of the invention will presently appear as the description proceeds in connection with the appended claims and the annexed drawings wherein.

Figure 1:
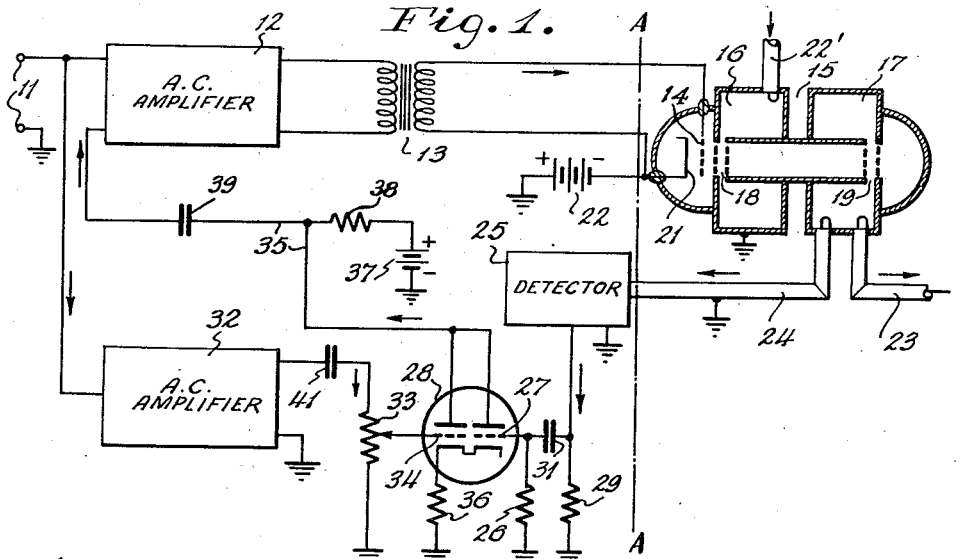
Fig. 1 is a partly diagrammatic illustration of the principles of my invention as embodied in apparatus wherein a modulating signal is applied to a control grid in a velocity variation type amplifier, and non-linearity in amplitude modulation is automatically compensated through a balanced feed-back circuit connected to the output hollow resonator of the amplifier.
Figure 7:
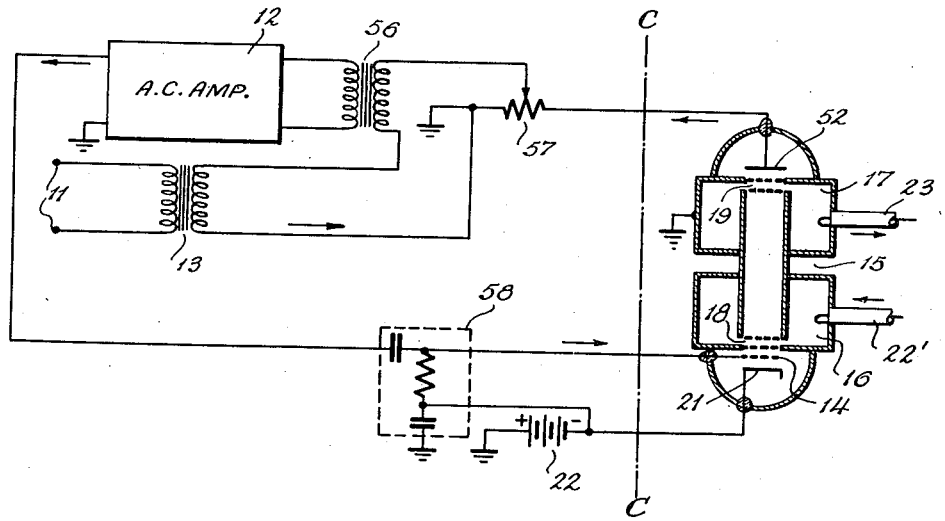
Fig. 7 is a diagrammatic view illustrating a further embodiment of the invention wherein the electron beam current is linear with the modulating voltage.

Fig. 8 is a diagrammatic view illustrating a further embodiment of the invention wherein the feed-back control of Fig. 1 is applied to a hollow resonator oscillator system capable of pure amplitude or pure frequency modulation; and Fig. 9 is a diagrammatic view illustrating still a further embodiment of the invention wherein the feed-back control of Fig. 7 is applied to the same hollow resonator system as in Fig. 8.

Referring to Fig. 1, a variable alternating current signal, after being received in a suitable apparatus, is impressed across terminals 11. The receiver may be of any known form and is not illustrated since its specific nature is immaterial to the invention.

The signal across terminals 11 is suitably amplified in a conventional type amplifier designated at 12 and passes through a transformer 13 to be impressed upon the control grid 14 of an amplifier tube 15 of the velocity variation type. The purpose of transformer 13 is to isolate the receiver and amplifier from the high voltage circuit beyond.

Tube 15 comprises a pair of independent resonator cavities 16 and 17 formed with input and output electrode gaps 18 and 19, respectively, and having a cathode 21 maintained at a fairly high negative potential by battery 22. Resonator cavity 16 is excited to resonant oscillation by ultra high frequency energy introduced through a coaxial transmission line 22' of conventional type.

In operation, the electrons in the beam from cathode 21 driven by battery 22 are subjected to velocity variation by the action of the high frequency field within resonator chamber 16. The beam becomes velocity grouped in passing from gap 18 to output gap 19, and energy is derived from the velocity grouped beam at gap 19 to maintain an ultra high frequency oscillating field within chamber 17. The above-described amplifier operation of tube 15 is well known, and further description is not necessary for understanding this invention. This operation is fully disclosed, for example, in United States Letters Patent No. 2,242,249 to which reference is made for further details.

Ultra high frequency energy is extracted from tube 15 by a conventional coaxial line and loop antenna assembly 23, and is thereby conveyed to any desired apparatus or device for utilizing the output, which energy comprises an ultra high frequency carrier wave at the frequency of the energy introduced by line 22' modulated by the signal appearing on control grid 14.

If tube 15 had no control grid 14, its output at lines 23 and 24 would comprise a uniform ultra high frequency voltage. What is desired for optimum performance is that grid 14 may accomplish strictly linear amplitude modulation of the ultra high frequency output of tube 15, namely, that variation of the signal voltage on terminals 11 during reception of the original signal may cause proportional amplitude variation of the electron beam from cathode 21, which latter variation appears in turn as proportional amplitude modulation of the ultra high frequency output of tube 15.

Unfortunately, this optimum condition cannot be insured as a practical matter in apparatus of the simple assemblage as above described which is usually subject to modulation distortion. This distortion mainly arises from three sources. Initially, the wave form of the received signal may be distorted during passage of the signal through amplifier 12 and transformer 13. Second, as a practical matter it is difficult to insure that the voltage impressed on grid 14 proportionally varies the electron beam current strength. Finally, the tube 15 may not be capable of linear amplification because of such inherent factors as above described.

This embodiment of the invention is especially directed to preferred systems and apparatus for accomplishing and maintaining the desired linear amplitude modulation in the output of tube 15. Individual compensation of possible distortion factors would involve complications and correlated corrections which would probably be impractical. My compensation apparatus is simple and reliable in operation and takes care of all the above factors.

My compensation apparatus in its preferred embodiment comprises arrangements for comparing the original unmodulated signal wave with the modulation envelope of the corresponding carrier wave in the output of tube 15. To this end a small amount of ultra high frequency energy is extracted from chamber 17 by coaxial line 24 and fed into a detector device indicated at 25. This extracted energy comprises a high frequency voltage wave corresponding to the output of tube 15, as modulated by the signal voltage at 14. Any non-linear amplitude or other distortion will appear in this output of tube 15, and detector 25 is of such nature that its output consists of an alternating voltage wave directly proportional to the modulation envelope of the carrier wave of the output of tube 15. Detector 25 thus suppresses and filters out the ultra high frequency components of the tube output.

This alternating voltage from detector 25 will be substantially of the same amplitude and frequency as the original signal. It appears across resistor 26 and is impressed on grid 27 of a double triode comparator tube 28. A resistor 29 provides a path to ground for direct current from the detector, and blocking condenser 31 prevents the direct current from reaching tube 28. Any non-linear amplitude modulation by the signal will be present in the voltage on grid 27.

On the other side of tube 28, the original alternating voltage signal is linearly amplified at 32 and appears across variable potentiometer 33 which is connected to grid 34 of tube 28. The anodes of tube 28 are connected to the input of amplifier 12, as by lead 35. The cathodes of tube 28 are connected through resistor 36 to ground.

The direct current circuit of tube 28 comprises a battery 37 connected through a resistor 38 and ground to the anodes and cathodes respectively of the tube. Blocking condensers 39 and 41 prevent direct current from battery 37 from reaching the associated amplifiers.

In operation, the various circuit elements are so chosen that the alternating voltages appearing on grids 27 and 34 are of opposite phase, and if necessary substantially equal amplitude may be obtained by adjustment of potentiometer 33. Tube 28 therefore acts to add these alternating voltages, and if they are always exactly equal and identical, as will be the case where no non-linear amplitude modulation by the signal has taken place, no voltage will appear on lead 35 and no control is necessary or provided for amplifier 12.

However, should the amplitude modulation effected by the signal be non-linear so that the voltage wave from detector 25 is distorted relative to that of the original signal, this will result in a control voltage on lead 35, and this resultant control voltage is employed to automatically adjust the system until the modulation envelope in the output of tube 15 corresponds to strictly linear modulation by the signal, at which point there is no voltage on lead 35 and the control system returns to rest.

The necessary phase relation of the compared voltages may be obtained by proper selection of the number of amplifier stages, or by reversal of the transformer leads, or a suitable phase shifter may be inserted into the system. Preferably amplifiers 12 and 32 are identical, and it is essential that amplifier 32 be linear. Any non-linearity in amplifier 12 can be taken care of by the automatic control above-described. The compared voltages are made equal by adjustment of potentiometer 33, and this adjustment is an essential preliminary to automatic modulation control.

Since the output of tube 28 is zero when the amplitude modulation is linear, the polarity of control voltages which may appear on lead 35 depends on the sense of the modulation distortion. As shown, the control voltage is inserted in series with the original signal voltage and predistorts the latter so that the actual voltage applied to grid 14 is no longer linear with respect to the voltage at 11, but instead is distorted and corrected by factors which compensate for all effects which would have normally produced non-linear amplitude modulation of the output of tube 15. In short, the voltage on grid 14 is made such as to effect linear amplitude modulation of the hollow resonator output at every point in each cycle. This control is automatic and instantaneous, and effective throughout operation of the system.

If desired, the control voltage from lead 35 may be applied directly to grid 14, cathode 21 or some other electrode in the tube for changing the beam characteristics to obtain the above results in the above or any of the following embodiments of the invention.

Figure 2:
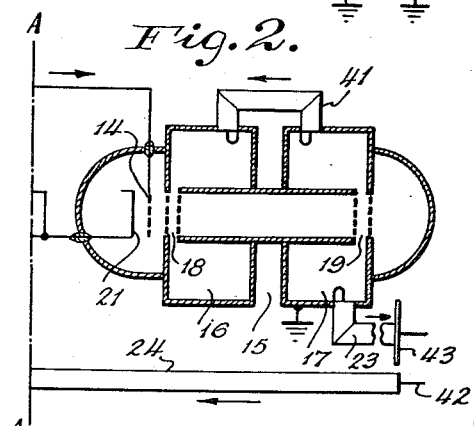
Fig. 2 illustrates the invention as applied to a two resonator oscillator, Fig. 2 being the same as Fig. 1 to the left of line A—A.

Fig. 2 illustrates the invention as applied to an electron velocity variation device similar to Fig. 1, but having a feed-back coupling 41 between the resonator cavities so that the device operates as an oscillator of the self-excited type as also described in said Patent No. 2,242,249. Moreover, instead of extracting energy directly from chamber 17, I may obtain the output of tube 15 indirectly by employing an antenna 42 coupled to line 24 for picking up output energy radiated from the antenna indicated at 43 in line 23.

In operation the apparatus of Fig. 2 is effectively the same as Fig. 1. Tube 15 being here an oscillator, control grid 14 probably effects appreciable frequency modulation as well as amplitude modulation in the carrier wave. However, since these unwanted frequency components are effectively eliminated in detector 25, such frequency modulation has no influence on the operation of the system for obtaining pure linear amplitude modulation.

Figure 3:
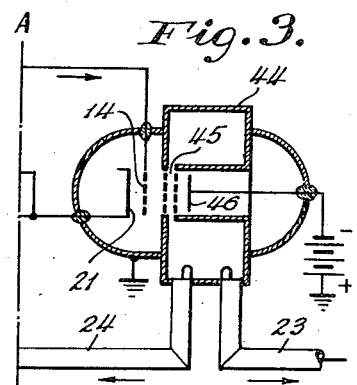
Fig. 3 is similar to Fig. 2, illustrating the invention as similarly applied to a reflex type oscillator.

Fig. 3 illustrates the invention as applied to a reflex oscillator tube 44 of the type disclosed in Fig. 2 of United States Letters Patent No. 2,250,511. The resonator chamber in this tube has only one electrode gap 45 through which the electron beam is projected by cathode 21 and then returned therethrough by the action of charged reflector 46. Grid 14 is connected to be controlled exactly as in Fig. 2.

Figure 4:
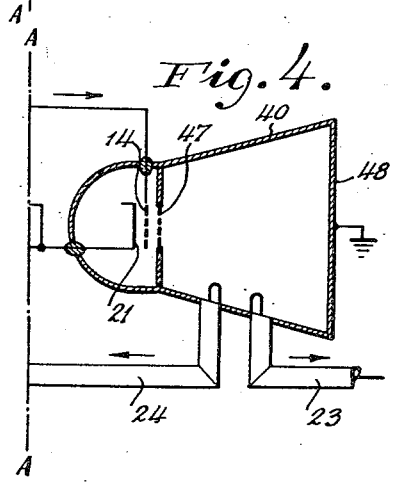
Fig. 4 is similar to Fig. 2, illustrating the invention as similarly applied to a velocity variation hollow resonator device of the type in which the electron beam is velocity grouped during a single traverse of an oscillating field.

Fig. 4 further illustrates the invention as applied to an oscillator device 40 of the type disclosed in United States Letters Patent No. 2,269,456 wherein the electrons become velocity grouped during passage through the ultra high frequency field between grid 47 and collector wall 48. Control of grid 14 is here also the same as in Fig. 2.

Figure 5:
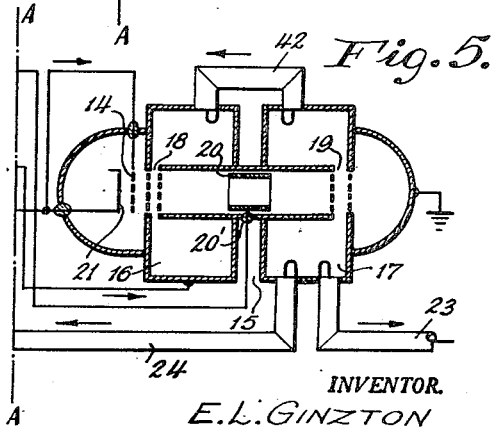
Fig. 5 is a partly diagrammatic view illustrating the apparatus of Fig. 1 adapted for obtaining linear frequency modulation.

Fig. 5 illustrates the system of Fig. 1 adapted for linear frequency modulation. Here the modulating signal voltage is not introduced as at grid 14 of Fig. 1, but instead is introduced at the hollow cylindrical electrode 20 surrounding the beam passing through the drift space. Electrode 20 and its input lead from transformer 13 are insulated as by glass ball 20' from the grounded oscillator walls, and the other input lead for the modulating signal voltage is connected to the drift tube wall, as illustrated.

Whereas grid 14 in Fig. 1 effects amplitude modulation in the oscillator, electrode 20 effects frequency modulation as well as some amplitude modulation. Electrode 20 controls the flight time of electrons between resonators 16 and 17 to thus shift the phase of energy transfer between the resonators. Since the resonators are connected by feed-back 42, this phase shift between two resonant components of the circuit changes the frequency of the high frequency circuit as a function of the voltage applied to electrode 20. In this case, of course, detector 25 is a frequency-modulation detector.

If pure frequency modulation is desired, the signal voltage may be applied to both electrode 20 and a grid 14, with the latter arranged to act as a beam intensity control to counteract the amplitude modulation produced by electrode 20.

Figure 6:
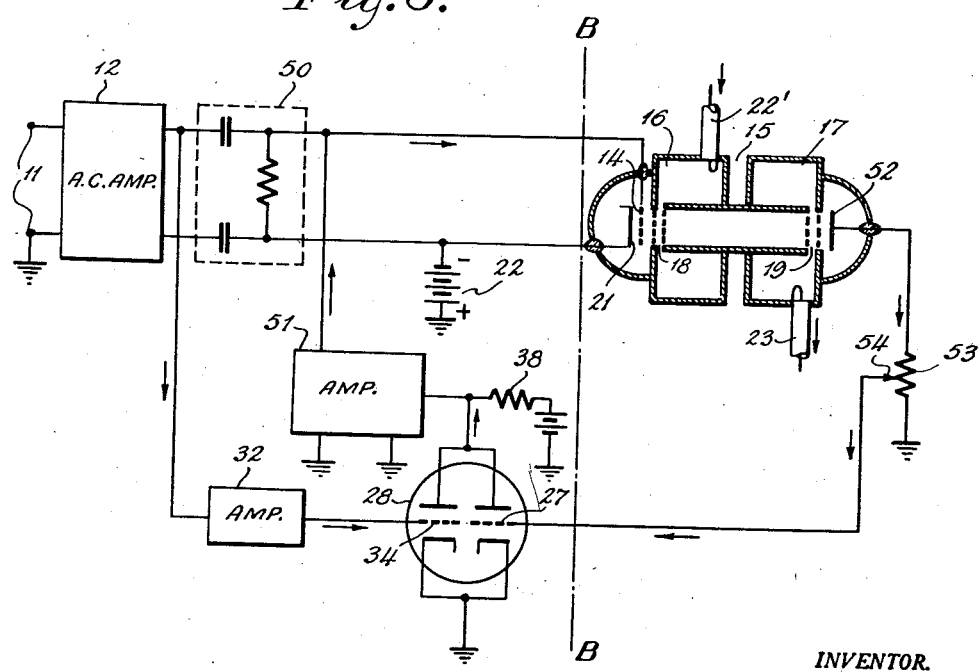
Fig. 6 illustrates diagrammatically a further embodiment of the invention similar to Fig. 1, but where the feed-back control is energized from a collector electrode in the velocity variation device.

The apparatus in Fig. 6 is generally similar to that of Fig. 1, but linear amplitude modulation is accomplished by correction of any non-linear relation between the modulation voltage and the beam current through tube 15. Also, in Fig. 6, the equivalent high voltage isolator network indicated at 50 is substituted for the transformer 13 of Fig. 1, and a suitable amplifier 51 is inserted in the output of tube 28, these latter details being optional for convenience.

Amplifier tube 15 is provided in Fig. 6 with a collector electrode 52 connected to ground through a resistance 53 having an adjustable tap 54. A lead 55 connects tap 54 to grid 27 of tube 28, and the other grid 34 is connected to receive the signal input voltage as in Fig. 1. The voltage on grid 27 represents the voltage drop of the beam current from collector 52 in the part of resistance 53 selected by adjustment of tap 54. As in Fig. 1, any suitable linear amplifier, phase shifting or other devices may be employed for insuring that the voltages on grids 34 and 27 are equal in amplitude and opposite in phase.

In operation, the voltage drop across resistor 53 due to the beam current is compared with the signal voltage in tube 28 to effect control of the modulating voltage on grid 14. The amplitude modulation of the current in tube 15 is determined by grid 14, and this current amplitude modulation is normally non-linear with respect to the modulation voltage as above pointed out. In this embodiment of the invention, I collect and feed back the beam current to produce an alternating voltage proportional to the tube current for comparison with the signal voltage in tube 28. When this feed-back voltage is not linear with respect to the signal voltage, tube 28 delivers a corresponding output control voltage which acts through amplifier 51 to compensatively change the input signal as described in connection with Fig. 1. In this manner, the signal voltage is continuously corrected until it is of such nature as to produce a linearly related tube current, which means that grid 14 effects substantial linear amplitude modulation in the tube 15. This condition of balance is maintained during operation.

If desired, the feed-back control of Fig. 6 may be applied equally well to any of the oscillator devices shown in Figs. 2–4, as by installing those devices to the right of line B—B of Fig. 6, similarly to the manner they are combined with Fig. 1. To accomplish this, the oscillator of Fig. 2 would be provided with a collector electrode connected in the system like collector 52 of Fig. 6, and grid 27 would be connected to the walls of resonators 44 and 48 in Figs. 3 and 4, these walls being connected through a suitable impedance to ground and serving as collector electrodes therein. Similarly the feed-back control of Fig. 6 may be employed in the arrangement shown in Fig. 5.

Fig. 7 illustrates a further embodiment of the invention wherein the feed-back control voltage is derived from the tube current as in Fig. 6, but is compared to the signal voltage in a simple potentiometer arrangement rather than in the comparator triode.

The signal voltage appears across terminals 11 and is fed by the secondary of transformer 13 to the primary of another transformer 56 through a potentiometer 57. The secondary of transformer 56 is connected to amplifier 12 which in turn is connected through a suitable isolation network 58 to provide the modulation voltage on grid 14 for modulating the amplitude of the beam current from cathode 21, the output voltage of the amplifier appearing between cathode 21 and control grid 14.

Collector electrode 52 for receiving the modulated beam current is connected in series with potentiometer 57, so that a voltage drop proportional to the beam current appears across the potentiometer. This voltage drop is connected in the potentiometer so that a fraction thereof is subtracted from the output voltage of transformer 13 at balance. If the tube current changes linearly with the signal voltage, balance is maintained. However, should the tube current change non-linearly, the associated voltage drop in the potentiometer will change non-linearly. In order to compensate for such non-linearity, amplifier 12 adds or subtracts, as the case may be, the instantaneous voltages necessary to provide such voltage on grid 14 as will produce the desired linearity in tube current.

As with the apparatus of Fig. 6, the various oscillator devices of Figs. 2–5 may be employed to the right of line C—C in Fig. 7, connections being made as suggested above in discussing Fig. 6.

Figs. 8 and 9 illustrate the invention as applied to a hollow resonator electron velocity modulation oscillator of the type having auxiliary electron beam arrangements and adapted for obtaining either pure amplitude or pure frequency modulation, or modulations of intermediate purity.

Referring to Fig. 8, the alternating modulating signal from source 60 is impressed across the primary of a transformer 61, across the secondary of which are connected grounded center-tap potentiometers 62 and 63 having adjustable taps 64 and 65.

The hollow resonator oscillator comprises separate cylindrical input and output resonator chambers 66 and 67, respectively, interconnected by drift tubes 68, 69 and 70 and coupled by feedback line 71. Electrons driven from cathode 72 by battery 73 pass through the resonator chambers, being subjected to velocity modulation by the high frequency field in chamber 66 and, after becoming grouped during passage through drift tube 68, giving up energy to the field in chamber 67, similarly to the operation of Fig. 2.

A control grid 74, which may be adjusted to desired bias by potentiometer 70 and which corresponds to grid 14 in Fig. 1, is connected to tap 65 through switch 80 so as to place a component of the modulating signal potential on the grid 74. A portion of the output of chamber 67 is connected to detector 25 as in Fig. 1, while the signal voltage component from tap 65 is impressed on amplifier 32. The alternating voltages derived from detector 25 and amplifier 32 are compared in tube 28 similarly to the operation explained in connection with Fig. 1, and lead 75 impresses the compensating control voltage from tube 28 on grid 74 to correct for departures from linearity in the output.

Fig. 8 also embodies arrangements for selectively obtaining varying purities or combinations of frequency or amplitude modulation. A pair of cathodes 76 and 77 are energized by batteries 78 and 79 connected in series with battery 73. Electron beams are projected from cathodes 76 and 77 through the resonators in velocity changing and energy interchanging relation with the resonators. The driving voltages on these two auxiliary electron beams are therefore different, and the differential is such that the electron grouping is in opposite phase in the two beams. Therefore, the auxiliary beams neutralize each other in that taken together they contribute no energy to the output resonator.

Control grids 81 and 82 are connected to adjustable tap 64 for impressing a component of the signal voltage on them. By means of potentiometers 83 and 84, I regulate the bias voltage on grids 81 and 82 until the average electron currents therethrough are equal to each other and one-half of the intensity of the beam from cathode 72.

To provide pure linear amplitude modulation, I adjust tap 64 until the modulation voltage on each of grids 81 and 82 is equal to one-half the voltage on grid 74 and in opposite phase thereto. This provides that the average electron density of the three electron beams in resonator 67 is constant, and insures that there is substantially no frequency modulation. In effect, this maintenance of average electron intensity in the resonator maintains the dielectric value of the resonator constant, to thereby accomplish the desired end.

On the other hand, when substantially pure linear frequency modulation is desired, switch 80 in the lead between grid 74 and tap 65 is opened, so that the signal voltage no longer produces amplitude modulation of the beam from cathode 72. At the same time, tap 64 is regulated to place the full signal voltage on grids 81 and 82.

As before, the electron grouping in the beams from cathodes 76 and 77 is in opposite phase, so that these beams contribute substantially no energy to the system. However, the resonant frequency of the oscillator is modulated at the signal frequency, because there is now no signal on grid 74, and the modulating voltage on grids 81 and 82 is in phase.

Under the above conditions, a small portion of the oscillator output is fed into detector 25 which extracts and feeds to grid 27 a voltage having the signal frequency. Detector 25 is of course now a frequency modulation detector. Similarly to the operation described in Fig. 1, any non-linear frequency modulation is detected in tube 28 and fed back to control the signal source or, as illustrated, grid 14, so as to introduce corrective factors which will produce linear frequency modulation in the oscillator output.

Further, it is apparent that by relative adjustment of taps 64 and 65 intermediate the extremes above described, I may obtain varying degrees of purity of amplitude and frequency modulation, to be linearly controlled by the invention.

The above-described arrangements for obtaining amplitude or frequency modulation of desired relative purity are disclosed and claimed in application Serial No. 470,678 filed December 30, 1942, and, per se, do not comprise my invention. My invention applies linear control devices to those arrangements, so that I obtain effective linear modulation by the signal.

Fig. 9 illustrates a form of the invention having certain features of both Figs. 7 and 8. The resonator device is substantially the same as that of Fig. 8 while the control circuit is similar to that of Fig. 7. The modulating signal voltage is applied to grid 14, and lead 185 feeds the control voltage to grid 14 as illustrated. In the control circuit, the modulating voltage is compared to the voltage drop of the current from collector 52 in potentiometer 57, as in Fig. 7, and the modulation potential is controlled to maintain the beam current from cathode 72 linear with respect to changes in signal potential. The arrangements for insuring pure amplitude or pure frequency modulation or any intermediate relative purity modulations are the same as in Fig. 8.

Thus, I have provided control apparatus for producing linear amplitude and/or frequency modulation in varying degrees of purity by introducing corrections and compensations through balanced feed-back arrangements responsive to the output of the electron velocity variation device and preferably adapted to automatically control the electron beam. These control features may be applied to any of the systems disclosed in said Serial No. 470,678, for example, without departing from the spirit of the invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. Ultra high frequency apparatus comprising an electron velocity variation device having a control electrode and a beam collector electrode, input means coupled to said device for applying a modulating signal voltage to said device to modulate the high frequency output of said device, means including said collector electrode coupled to said device for obtaining a voltage corresponding to the modulation envelope of said output, means coupled to said voltage-obtaining means for comparing said obtained voltage with a version of the input signal voltage, and means coupled to the output circuit of said comparison means for controlling the effect of said modulating signal to improve the modulation in said device.

2. Ultra high frequency apparatus comprising an electron velocity variation device, input means coupled to said device for applying a modulating signal voltage to said device to modulate the high frequency output of said device, a comparator device having a pair of control grids, means coupled to said pair of grids for applying thereto versions of said signal voltage and a voltage derived from said modulated output, and means coupled to said comparator device for applying the output of said comparator device for control of the effect of said signal voltage to obtain substantially linear amplitude modulation in said device.

3. Ultra high frequency apparatus comprising an electron velocity variation device, a control electrode in said device, a collector electrode in said device for receiving the beam current, means coupled to said device for applying a modulation potential to said device, and feed-back means coupled to said device and responsive to control signals derived from the beam current received by said collector electrode for producing substantially linear modulation by said signal.

4. Ultra high frequency apparatus comprising an electron velocity variation device having a hollow resonator means, means in said device for passing an electron beam through said resonator means, means coupled to said device for applying a modulating signal to said device to modulate the high frequency output thereof, means in said device providing a pair of auxiliary electron beams passing through said resonator means to group the electrons thereof, said auxiliary beams each having electron groupings phased to at least partially cancel their energy interchange with said resonator means, means coupled to said device and with said third mentioned means for applying said modulating signal to said auxiliary beams, and means coupled to an output of said device for deriving a control wave corresponding to the modulation envelope of said modulated output and for utilizing said control wave to produce substantially linear modulation by said signal.

5. Ultra high frequency apparatus comprising an electron velocity variation device, input means for applying a modulating signal voltage to said device to modulate the high frequency output wave thereof, comparator means having a pair of control grids, means coupled to said pair of grids for applying thereto versions of said signal voltage and a voltage varying according to said modulated output wave, and means coupling the output circuit of said comparator means to said device to control the modulating effect of said signal voltage.

6. Ultra high frequency apparatus comprising an electron velocity variation device employing an electron beam, an electron collector electrode in said device, means coupled to said device for varying a potential applied to said device in accordance with a signal voltage for modulating the electron beam therein, and means coupled to said electrode and responsive to the electronic current in said electrode for improving the modulation linearity of said modulated beam.

7. Ultra high frequency apparatus comprising an electron velocity variation device employing an electron beam, an electron collector electrode in said device, means coupled to said device for varying a potential applied to said device in accordance with a signal voltage for modulating the electron beam therein, and means coupled to said collector electrode and responsive to the electronic current in said collector electrode for modifying said potential variation to improve the modulation linearity of said modulated beam.

8. High frequency apparatus comprising means for producing an electron beam, a first resonator adapted to be coupled to said beam, a second resonator adapted to be coupled to said beam, means coupled to said first resonator for supplying thereto a high frequency excitation voltage for modifying the electron velocity of said beam, a source of signal voltage, means operative on said beam and coupled to said source for causing the amplitude thereof to vary in relation with said signal voltage, and means coupled to said source and to said last-named means, and responsive to amplitude variations of said beam, for modifying the variation of beam amplitude in relation to said signal voltage.

9. High frequency apparatus comprising means for producing an electron beam, a first resonator adapted to be coupled to said beam, a second resonator adapted to be coupled to said beam, means coupling said second resonator to said first resonator for producing oscillations at a high frequency in said first and second resonators, a source of signal voltage, means operative on said beam and coupled to said source for causing the said frequency to vary in relation with said signal voltage, and means coupled to said source and to said last-named means, and responsive to frequency variations of said oscillations, for modifying the variation of said frequency in relation to said signal voltage.

10. Electrical apparatus comprising an amplifier, means coupled to said amplifier for applying a signal voltage to said amplifier to control the output thereof, a second amplifier connected to amplify said signal voltage, comparator means having a pair of control grids, means coupled to said grids for applying to said grids versions of the output of said first amplifier and of the output of said second amplifier, and means coupled to said comparator means and responsive to the output of said comparator means for modifying the output of said first amplifier.

11. Electrical apparatus comprising an amplifier, means coupled to said amplifier for applying a signal voltage to said amplifier to control the output thereof, comparator means having two grids, means coupled with said comparator means and with said amplifier for applying to a load versions of the output of said amplifier and of the output of said comparator means, means coupled to said amplifier for applying a version of the output of said amplifier to a first of said grids, and means coupled to the second of said grids for applying thereto a signal responsive to current in said load to control the output of said comparator in accordance with differences between said version and said current-responsive signal.

EDWARD L. GINZTON.

REFERENCES CITED

The following references are of record in the file of this patent:

UNITED STATES PATENTS

| Number | Name | Date |
|---|---|---|
| 2,070,666 | Llewellyn | Feb. 16, 1937 |
| 2,172,453 | Rose | Sept. 12, 1939 |
| 2,200,962 | McArthur | May 14, 1940 |
| 2,200,986 | Fraenckel | May 14, 1940 |
| 2,276,247 | Hahn | Mar. 10, 1942 |
| 2,278,210 | Morton | Mar. 31, 1942 |
| 2,280,026 | Brown | Apr. 14, 1942 |
| 2,280,824 | Hansen et al. | Apr. 28, 1942 |
| 2,288,275 | Ferrell | June 30, 1942 |
| 2,293,387 | Haeff | Aug. 18, 1942 |